United States Patent
Świętosławski et al.

(10) Patent No.: US 11,051,511 B2
(45) Date of Patent: Jul. 6, 2021

(54) BEES ATTRACTING AND BEE TRANQUILIZING COMPOSITION AND THEIR USE IN AGRICULTURE, HORTICULTURE AND APICULTURE

(71) Applicant: ICB PHARMA SPOLKA JAWNA, Jaworzno (PL)

(72) Inventors: Janusz Świętosławski, Jaworzno (PL); Wojciech Wieczorek, Czechowice-Dziedzice (PL)

(73) Assignee: ICB PHARMA SPOLKA JAWNA, Jaworzno (PL)

( * ) Notice: Subject to any disclaimer, the term of this patent is extended or adjusted under 35 U.S.C. 154(b) by 0 days.

(21) Appl. No.: 16/094,913

(22) PCT Filed: Apr. 19, 2016

(86) PCT No.: PCT/PL2016/000043
§ 371 (c)(1),
(2) Date: Oct. 19, 2018

(87) PCT Pub. No.: WO2017/183998
PCT Pub. Date: Oct. 26, 2017

(65) Prior Publication Data
US 2019/0116789 A1    Apr. 25, 2019

(51) Int. Cl.
*A01N 31/16*  (2006.01)
*A01N 35/02*  (2006.01)
*A01N 25/04*  (2006.01)
*A01N 25/22*  (2006.01)
*A01N 25/30*  (2006.01)

(52) U.S. Cl.
CPC .............. *A01N 31/16* (2013.01); *A01N 25/04* (2013.01); *A01N 35/02* (2013.01); *A01N 25/22* (2013.01); *A01N 25/30* (2013.01)

(58) Field of Classification Search
None
See application file for complete search history.

(56) References Cited

U.S. PATENT DOCUMENTS

| 2006/0008492 A1 | 1/2006 | Janowicz et al. |
| 2008/0220038 A1* | 9/2008 | Franklin ............... A01N 25/28 424/417 |
| 2012/0171268 A1* | 7/2012 | VanderDussen ....... A01N 37/02 424/405 |

FOREIGN PATENT DOCUMENTS

| EP | 2 735 229 A1 | 5/2014 |
| FR | 2 593 023 A1 | 1/2006 |
| PL | 1891662 B1 | 6/1999 |
| WO | 2013/005200 A1 | 1/2013 |

OTHER PUBLICATIONS

Eriksson et al., "It's all in the mix: blend-specific behavioral response to a sexual pheromone in a butterfly", Frontiers in Physiology, vol. 7, Article 68, (Feb. 2016), pp. 1-10 (Year: 2016).*
D T Malerbo-Souza et al, "Honey Bee Attractants and Pollination in Sweet Orange, *Citrus sinensis* (L.) Osbeck, Var. Pera-Rio Introduction," Journal of Venomous Animals and Toxins Including Tropical Diseases, Jun. 5, 2004, pp. 144-153, vol. 10, No. 2, 10 pages.
Eric, "Essential Oil Recipe for Honeybees," gardenfork.tv, Jul. 23, 2014, 5 pages.
Roy Cropley, "Harlow Bees—letter Mar. 2014," harlowbees.co.uk, Mar. 1, 2014, 2 pages.
Bibliographic Data, including, English Abstract, PL 189 162 B1, 1 page.
International Search Report, PCT/PL2016/000043, dated Jul. 20, 2016, 5 pages.

* cited by examiner

*Primary Examiner* — Kyung S Chang
(74) *Attorney, Agent, or Firm* — Ware, Fressola, Maguire & Barber LLP

(57) ABSTRACT

A bee attracting and bee tranquilizing composition has the form of an oil/water emulsion in aqueous phase, wherein the oil phase contains citral (3,7-dimethylocta-2,6-dienal), eugenol (4-allyl-2-methoxyphenol) and an oil carrier in an amount of 10% to 50% by weight of the composition, wherein the weight ratio of citral to eugenol is in a range from 1 to 10, and more preferably in a range from 1.7 to 5, and the aqueous phase contains a sweetener in an amount of 15% to 60% by weight based on the total weight of the aqueous phase. The sweetener is preferably selected from the group including: saccharose, fructose, glucose, sugar, inverted sugar syrup, maltose syrup and mixtures thereof. The invention also relates to methods and uses of such a composition for increasing the productivity of a crop area requiring bee pollination in agricultural and/or horticultural environments.

14 Claims, No Drawings

BEES ATTRACTING AND BEE TRANQUILIZING COMPOSITION AND THEIR USE IN AGRICULTURE, HORTICULTURE AND APICULTURE

The present invention relates to a bee attracting and bee tranquilizing composition having a form of an oil/water emulsion in aqueous phase. The invention also relates to methods and uses of such a composition for increasing the productivity of a crop area requiring bee pollination in agricultural or horticultural environments, as well as methods and uses of such a composition for increasing the efficiency of introducing a replacement queen bee to a new bee colony, of joining bee colonies and for tranquilizing bees in apiculture applications.

BACKGROUND OF THE INVENTION

Bee behavior, as well as transmission of a significant part of the information to bees and between bees in their colonies is mainly regulated by conveying different fragrances and pheromones.

Various bee attracting compositions containing fragrances and pheromone components are known from the state of art.

Publication RU 2146868, for example, discloses a composition for attracting bee swarms containing pheromone components of Nasonov's gland: geraniol, citral, and mixture of geranic and nerolic acids 9-oxo-2E-decenoic acid, phenylacetic and phenylpropionic acid methyl esters, special-type stabilizer, ethanol, 2% aqueous solution (gel) of ammonia-modified maleic anhydride/styrene copolymer rarely cross-linked by ethylene glycol. The composition features increased efficiency and prolonged activity.

Publication US 2003/0147933 A1 discloses a composition for attracting bees using a substrate coated with an adhesive composition containing a combination of nerol, geraniol, neral, geranial, nerolic acid, geranic acid, and E,E-farnesol. Bees are lured in the interior of the synthetic hive, are drawn to the adhesive component by the bee attracting composition, and become permanently immobilized upon contact with the adhesive.

Publication GB 2095998 also discloses a synthetic bee pheromone and its use in attracting a colony of bees to a hive or trap, containing essential components E-citral or a mixture of (E)- and (Z)-citrals, geraniol and nerolic acid, preferably in the weight ratio of 1:0.1:0.1 to 1:10:10. The invention also discloses a method of luring a colony of bees to a hive or trap which comprises positioning the lure at or near the entrance to the hive or trap.

Compositions containing fragrances and pheromone components are also used to reduce the aggressiveness or tranquilize bees.

Patent publication FR 2593023 for instance discloses a method of eliminating or reducing the aggressiveness of bees when beehives are being opened and handled by treating a beehive with a composition in a form of an aqueous emulsion or dispersion containing as active agents, acetic acid or a halogenated derivative of the latter or else alkaline salts of such acids, which also advantageously contains citral or a similar aldehyde as well as an emulsifier and an antioxidant.

Publication FR 2964302 discloses a product for ensuring a better tolerance of bee products administered in hives. The composition is a mixture of natural or synthetic essential oils, such as citral and geraniol. The olfactory message sent by this gland ensures a strong cohesion of the colony and efficient binding of each bee in the swarm or hive to which it belongs.

It has been the object of the present invention to provide a bee attracting and bee tranquilizing composition featuring properties which are superior to those known from the state of art.

Another object of the present invention has been to provide a method for increasing the productivity of a crop area requiring bee pollination with the use of such a bee attracting composition.

Yet another object of the present invention has been to provide a method for increasing the efficiency of introducing a replacement queen bee to a new bee colony, of joining bee colonies and for tranquilizing bees with the use of such a bee tranquilizing composition.

SUMMARY OF THE INVENTION

According to the present invention there is provided a bee attracting and bee tranquilizing composition having a form of an oil emulsion in an aqueous phase, wherein the oil phase contains citral (3,7-dimethylocta-2,6-dienal), eugenol (4-allyl-2-methoxyphenol) and an oil carrier in an amount of 10% to 50% by weight based on the total weight of the composition and the weight ratio of citral to eugenol is in a range from 1 to 10, and more preferably in a range from 1.7 to 5, while the aqueous phase contains a sweetener, preferably in an amount of 15% to 60% by weight based on the total weight of the aqueous phase.

During consumption of sweeteners, enzymes contained in the bees saliva are added to feed which is then stored in the bees crops. These enzymes enable for inversion of the complex sugars into simple ones that are contained in bee hemolymph and therefore may be properly treated by bees. Therefore the term "sweetener" as used in the context of this specification denotes any soluble carbohydrate that can be properly consumed and treated by bees including mixtures of such carbohydrates.

Furthermore such an amount of a sweetener prevents fermentation of the composition during storage.

Preferably said sweetener is selected from the group including: saccharose, fructose, glucose, sugar, inverted sugar syrup, maltose syrup and mixtures thereof.

Preferably said oil carrier is a vegetable oil, in particular rapeseed oil, corn oil and mixtures thereof.

Preferably the isomer proportion of neral and geranial in citral is within 0.8 to 1.2.

Preferably said oil phase further comprises an agent modifying the viscosity of the oil phase, and preferably polymeric surfactant, in an amount of 0.2% to 4% by weight based on the total weight of the composition.

Preferably the composition further comprises at least one additional agent preferably selected from the group including: antifoam agents, surfactants and dispersion stabilizers.

Preferably the composition further comprises at least one additional agent enhancing the oxidative stability of the composition.

Depending on the identity of the particular stabilizer, these compounds can have different modes of action. Some stabilizers chelate metals or other catalytic species that would otherwise interact with the triglycerides of the oil and increase the rate of oxidation of the oil. Other stabilizers act as antioxidant molecules and react with free radical species which could oxidize the fatty acids of the triglycerides to peroxides, which can in turn oxidize with other fatty acids as described in more detail above in section I.A. Exemplary stabilizers can include anoxomer, ascorbic acid, ascorbyl palmitate, ascorbyl stearate, butylated hydroxyanisole (BHA), butylated hydroxytoluene (BHT), t-butyl hydro quinone (TBHQ), 3-t-butyl-4-hydroxyanisole, calcium ascorbate, calcium disodium EDTA, catalase, cetyl gallate, citric acid, sodium hypophosphate, sodium ascorbate, sodium erythorbate, sodium hypophosphate, sodium metabisulfite, sodium sulfite, sodium thisulfate pentahydrate, soy flour, sucrose, L-tartaric acid, α-terpineol, tocopherol, D-α-tocopherol, DL-α-tocopherol, tocopheryl acetate, D-α-tocopheryl acetate, DL-α-tocopheryl acetate, 2,4,5-trihydroxybutyrophenone, wheat germ oil, and combinations thereof.

Preferably pH of the composition is in the range of 4 to 7.

The composition according to the present invention is non-toxic and entirely biodegradable, does not evaporate rapidly after application and the oil phase provides for controllable release of the attractant ingredients.

According to the present invention there is also provided a method for increasing the productivity of a crop area requiring bee pollination comprising the step of applying, preferably spraying, a bee attracting composition as defined above over the crop area, preferably at the beginning of and/or during the blooming period.

The composition should be sprayed over the crop area in quantity sufficient to attract bees and to maintain them in the crop area for pollination which is to be chosen with regard to practical application. Obviously the composition increases attractiveness of the flowers also for other pollinating insects such as bumblebees, red mason bees, etc.

According to the present invention there is further provided a method for increasing the efficiency of introducing a replacement queen bee to a new bee colony comprising the step of applying, preferably spraying, a bee tranquilizing composition as defined above over a replacement queen bee and/or a bee colony and/or a honeycomb gathered with a bee colony to which the replacement queen bee is to be administered.

According to the present invention there is also provided a method for increasing the efficiency of joining bee colonies comprising the step of applying, preferably spraying, a bee tranquilizing composition as defined above over at least one bee colony and/or at least one honeycomb gathered with bee colony to be joined.

According to the present invention there is further provided a method for tranquilizing bees comprising the step of applying, preferably spraying, a bee tranquilizing composition as defined above over a predefined object and/or area, preferably in the vicinity of the bee hive, where bees tranquilization is required.

Obviously the composition may also be used for tranquilizing other members of the bee genus such as bumblebees, red mason bees, etc.

DETAILED DESCRIPTION OF THE INVENTION

Without further elaboration, it is believed that one skilled in the art can, using the preceding description, utilize the present invention to its fullest extent. The following preferred specific embodiments and tests are, therefore, to be construed as merely illustrative, and not limitative of the remainder of the disclosure in any way whatsoever.

Example 1

The following composition has been prepared by suspending constituents listed in Table 1 according to the listed order.

Both citral (CITRAL EXTRA BASF FG, CAS No. 5392-40-5) and eugenol (EUGENOL 926 INDESO, CAS No. 97-53-0) have been obtained from Ernesto VentOs, SA (Spain). Citral (3,7-dimethylocta-2,6-dienal) is a mixture of neral and geranial isomers having a strong, lemon-like odour and is sparingly soluble in water (0.42 g/l at 25° C.). Eugenol (4-allyl-2-methoxyphenol) has a strong, clove-like, spicy odour and is entirely insoluble in water. Inutec SP 1 t obtained from Surya Kimya San. Tic. Ltd. (Turkey) was used to modify the viscosity of the oil phase. Antifoam emulsion SAG 1572 was obtained from Momentive Performance Materials Inc. (USA) and Atlas G-5002 L surfactant was obtained from Croda Poland Sp. z o. o. (Poland).

TABLE 1

Constituents of the Composition 1

|  | Constituent (in order of addition) | amount [g/kg] |
|---|---|---|
| oil phase | Rapeseed oil (carrier) | 370 |
|  | Citral (CITRAL EXTRA BASF FG, CAS No. 5392-40-5) | 50 |
|  | Eugenol (EUGENOL 926 INDESO, CAS No. 97-53-0) | 25 |
|  | Inutec SP 1 t (Inulin Lauryl Carbamate) | 5 |
|  | Atlas G-5002 L (surfactant) | 9.4 |
| aqueous phase | Potable water | 380 |
|  | Sugar (sucrose) | 150 |
|  | Silicone antifoam emulsion (SAG 1572) | 0.1 |
|  | Citric Acid (anhydrous) | 0.5 |
|  | Propylene glycol | 9 |
|  | Xanthan gum | 1 |

Inutec SP 1 t oil phase dispersion has been mixed with water phase using a high cutting mixer for 2 minutes. Then xanthan gum in propylene glycol dispersion has been added as stabilizers and the composition has been mixed for 10 minutes to obtain milky oil/water (o/w) emulsion in sugar aqueous solution having pH in the range of 4.7 to 5.3. The composition contained about 7.5% by weight of active constituents (citral and eugenol) with citral amount twice as much as eugenol. Rapeseed oil was used as a carrier preventing rapid evaporation of active constituents.

Examples 2-7

The following compositions have been prepared by suspending constituents listed in Table 2 according to the listed order. Each composition has been mixed for 10 minutes to obtain oil/water emulsion.

TABLE 2

Constituents of the Compositions 2 to 7

|  | Constituent (in order of addition) | Ex. 2 | Ex. 3 | Ex. 4 | Ex. 5 | Ex. 6 | Ex. 7 |
|---|---|---|---|---|---|---|---|
|  |  | [% by weight based on the total weight of the composition] | | | | | |
| oil phase | Rapeseed oil | — | 20.0 | 30.0 | 30.0 | — | — |
|  | Corn oil | 31.5 | 10.0 | — | — | 27.0 | 19.0 |
|  | Citral Extra (BASF) | 5.0 | 10.0 | 6.0 | 6.0 | 10 | 15 |
|  | Eugenol 926 (Indesso) | 5.0 | 1.0 | 3.0 | 3.0 | 2 | 5 |
|  | BHT (antioxidant) | 0.05 | 0.05 | 0.05 | 0.05 | 0.05 | 0.05 |
|  | Inutec SL1 (Orafti) | 2.0 | 2.0 | 2.0 | 2.0 | — | — |
|  | Atlas G-5002 L (Croda) | 1.5 | 1.5 | 1.5 | 1.5 | — | 1.8 |
|  | Atlas G-1086 (Croda) | — | — | — | — | 3.5 | — |
|  | Atlox 4912 (Croda) | — | — | — | — | — | 1.7 |
| aqueous phase | Potable water | 36.1 | 44.6 | 34.6 | 29.6 | 29.6 | 22.6 |
|  | Attagel 50 (BASF) | 0.5 | 0.5 | 0.5 | 0.5 | 0.5 | 0.5 |
|  | Sugar (sucrose) | 16.0 | 8.0 | — | — | 10 | — |
|  | Inverted sugar syrup | — | — | 20.0 | — | 15 | 16 |
|  | Starch syrup | — | — | — | 25.0 | — | 16 |
|  | Silicone antifoam SAG 1572 | 0.01 | 0.01 | 0.01 | 0.01 | 0.01 | 0.01 |
|  | Citric Acid (monohydrate) | 0.04 | 0.04 | 0.04 | 0.04 | 0.04 | 0.04 |
|  | Proxel XL2 (preservative) | 0.2 | 0.2 | 0.2 | 0.2 | 0.2 | 0.2 |
|  | Glycerol | 2.0 | 2.0 | 2.0 | 2.0 | 2.0 | 2.0 |
|  | Xanthan gum | 0.1 | 0.1 | 0.1 | 0.1 | 0.1 | 0.1 |

Inutec SL 1, obtained from Gova Group (Netherlands), Atlas G-5002 L, Atlas G-1086 and Atlox 4912, obtained from Croda Poland Sp. z o. o. (Poland) were used as surfactants and agents modifying the viscosity of the oil phase. Attagel 50 obtained from BASF (Germany) was used as rheology and viscosity modifier. Butylated hydroxytoluene (BHT) was used as an antioxidant. Antifoam emulsion SAG 1572 was obtained from Momentive Performance Materials Inc. (USA). Proxel XL2 obtained from Lonza Group AG (Switzerland) was used as a microbiostat preservative. Xanthan gum and glycerol were used as stabilizers.

During further research the inventors tested the properties of the Composition 1 according the present invention prepared as described in Example 1 (further in the specification referred to as "Composition 1") in the following experiments and tests.

Test A. Northern Highbush Blueberry Bee Pollination

Composition 1 was tested on a northern highbush blueberry (*Vaccinium corymbosum*) cultivar "Bluecrop" productive plantation.

Composition 1 was sprayed on a 250 m long row of bushes in an amount of 2 L/1 ha (hectare) at the beginning of the blooming period (May 8, 2015). Another 250 m long row of bushes separated with one row from the one sprayed with Composition 1 was used as control row.

While the bushes were in flower the number of honey bees (*Apis mellifera*) present on the bushes were counted at certain days after the application of Composition 1 by two research workers walking with a similar speed along the treated and the control rows in order to determine the increase (I) of the bee presence in treated row over control row calculated as:

$$I = (N_T - N_C)/N_C$$

where $N_T$ and $N_C$ denote counted number of bees respectively in treated and control row. The results are listed in Table A.1.

TABLE A.1

Bee presence in treated row compared to control row

| | Day after application | | | | | | |
|---|---|---|---|---|---|---|---|
| | 1 | 5 | 7 | 11 | 14 | 21 | 23 |
| I [%] | 16.7 | 108.3 | 221.3 | 39.5 | 45.5 | 6.6 | −9.7 |

At 23 day of the research there were only 56 bees in treated row compared to 62 bees in control row (I=−9.7%). This observation indicates that after the blooming period the trees treated with Composition 1 were less attractive than control, untreated trees. This in turn enables for earlier application of other agricultural compositions including insecticide compositions over the treated row might otherwise be harmful to bees.

The yield of the rows of bushes were also calculated as listed in Table A.2. As observed the use of the Composition 1 provided 14% yield increase over the untreated bushes.

TABLE A.2

The yield from treated row compared to control row

| | Yield [converted into metric tonne/hectare] | Increase with regard to control [%] |
|---|---|---|
| Composition 1 | 17.9 | +14 |
| Control | 15.7 | 0 |

Test B. Pear Bee Pollination

Composition 1 was tested on pear cv. "Konferencja" productive plantation.

Composition 1 was sprayed in an amount of 2 L/1 ha (hectare) during blooming period (May 4, 2015), when about 40-50% of flowers were open on each tree. Untreated trees were used as control.

At the day of application and in the following two days the number of honey bees present on the trees were counted (20 trees were assessed), as well as the percentage of fruit set versus total no. of flower clusters, average yield per tree, average weight of 100 fruits and average no. of seeds per fruit (this parameter determines the level of a blossom pollination). The results are listed in Tables B.1 and B.2.

TABLE B.1

Number of bees per one tree (average of 20 trees)

| Observation date | Control | Composition 1 |
|---|---|---|
| May 4, 2015 | 4.5 | 6.9 |
| May 5, 2015 | 2.6 | 5.9 |
| May 6, 2015 | 2.3 | 3.2 |

TABLE B.2

Other crop parameters (average of 20 trees)

| | no. of fruits set/ no. of flower clusters [%] | Average crop per tree [kg/tree] | Average weight of 100 fruits [kg] | Average no. of seeds per fruit (average of 100 fruits) |
|---|---|---|---|---|
| Control | 55.45 | 10.9 | 13.6 | 2.6 |
| Composition 1 | 103.35 | 19.4 | 14.1 | 3.5 |

As observed the use of the Composition 1 not only doubled an average crop per tree but also increased the quality of the fruits grown on treated trees over the trees untreated.

Test C. Oilseed Rape Bee Pollination

Composition 1 was sprayed on two 5 hectare fields of oilseed rape cv, "Bogart" and "Konkret" at the beginning of the blooming period. The fields were sprayed on about 5 m wide strips along their borders and within each field on about 5 m wide strips separated by about 20 m wide unsprayed strips in 1% concentration (1 liter of Composition 1 per 100 liters of water).

The crop (kg/hectare) was determined during harvesting and compared to control, unsprayed fields. The results are listed in Table C.1.

TABLE C.1

Oilseed rape yield

| oilseed rape cultivar | Average yield [kg/ha] | | Yield increase | |
|---|---|---|---|---|
| | Composition 1 | Control | kg/ha | % |
| "Bogart" | 4815 | 3950 | 865 | 21.90 |
| "Konkret" | 4110 | 3450 | 660 | 19.10 |

As observed the use of the Composition 1 substantially increased the yield of both oilseed rape cultivars.

The experiments described below aimed to study the properties of the composition of the present invention to tranquilize bees in colonies.

The scent of the queen bee is a factor, which integrates a bee colony. Worker bees display an antagonism towards bees of a different scent (from different colony) including other queen bees secreting their own specific pheromones. Typical reaction to animals featuring different scent is primarily mutual stinging. It is therefore expected that by introducing to bee colonies suitable fragrance compositions it shall be to certain extent possible to guide bees behavior and disrupt or control the course of the transmission of information. These effects can have a practical use in the conduct of the apiary. The aim of the experiments was to estimate to what extent the administration of the composition according to the present invention can influence the behavior of bees.

Test D. Queen Bee Introduction

In the following experiment water solution of the Composition 1 was examined in queen bee introduction tests. To this end old queen bees were searched and taken away from 48 colonies that were to be examined. Subsequently orphaned colonies were randomly divided into 2 groups.

Replacement queen bees were then applied directly to the honeycombs containing the bees from tested colony which is probably the simplest and the fastest method of a new queen bee introduction. In the first group (the control group) replacement queen bees were applied directly to the honeycombs, wherein in the second group both the replacement queen bees and the Zander type artificial honeycombs were sprayed with 2.8 ml of the Composition 1 (1.4 ml for each side of the patch) before application of new queen bees. The applied dose resulted from the technical parameters of the sprayer. After seven days the presence of the queen bee and its egg laying were examined in each colony.

The results of the experiment are shown in Table D.1.

TABLE D.1

The efficiency of introduction of the queen bees to treated colonies compared to control ones

| Tested Colonies | No. of exposed replacement queen bees | No. of accepted replacement queen bees | Efficiency of introduction [%] |
|---|---|---|---|
| Control | 24 | 15 | 62.5 |
| Composition 1 | 24 | 24[*] | 100.0 |

[*]one queen bee with damaged wings has been found

As observed the control colonies featured significant loss of queen bees (37.5%) as compared to colonies and queen bees treated with Composition 1, where all queen bees have been accepted and initiated the process of laying eggs. During the review of the treated colonies one queen bee with damaged wings has been found which occurred probably accidentally by worker bees right after queen bee application on the honeycomb. No queen bee losses in colonies treated by Composition 1 is an excellent result, as it is commonly believed that no known method guarantees 100% efficiency of queen bee adoption.

Test E. Joining Bee Colonies

In the following experiment a suitability of Composition 1 for joining colonies was examined. Assessments were conducted twice in August and September, 2014. Two young colonies (so called nucleus colonies) gathered on an 4 to 5 artificial Zander type honeycombs were joined into one. Colonies are usually joined in this manner due to fact that such a small size of a single colony does not guarantee its safe wintering.

Before joining, all honeycombs gathered by bee colonies were sprayed with clean water (control group) or with water solution of the Composition 1 (treated group). Particular honeycombs were subsequently transferred into a new hive, and later transported to distant apiary, to avoid bees returning to the memorized place. Queen bees were not taken away from the combined families. In each tested group forty nucleus colonies were joined into twenty combined ones.

After 7 days the strength of colonies after joining measured as a number of gathered honeycombs, as well as queen bees presence were assessed. Collective results of the experiment are summarized in Table E.1.

TABLE E.1

| Observation date | Tested Group | No. of assessed colonies after joining | Average strength of colonies after joining (No. of gathered honeycombs) | Queen bees loses [%] |
|---|---|---|---|---|
| outset of August 2014 | Control | 10 | 7.7 | 20 |
|  | Composition 1 | 10 | 9.4 | 0(*) |
| outset of September 2014 | Control | 10 | 8.2 | 10 |
|  | Composition 1 | 10 | 9.1 | 0(*) |

(*)two queen bees from the initial colony remained

As it has been observed bees from the colonies treated with Composition 1 gathered on a larger number of honeycombs (displayed greater strength) as compared to the control group even though the strengths of the colonies before joining were similar.

It is probably due to the fact that bee workers from joined colonies after the application of Composition 1 were not stinging each other since unification of the fragrances of joined colonies prevented mutual aggression. On the other hand mutual stinging that occurred in the control colonies lead to certain bee losses and hence diminished the overall strength of the new combined colony.

The antagonism between bees from different colonies also concerns queen bees. Nonetheless a unique phenomenon has been observed in bee colonies treated with Composition 1, where both queen bees from two joined colonies were left alive. Moreover no mutual aggression between these queen bees has been observed. Under normal circumstances, queen mother bees do not tolerate each other and immediately try to sting each other.

Test F. Tranquilizing Worker Bees

In this experiment properties of the Composition 1 in tranquilizing worker bees were examined.

To this end in the vicinity of bee hives (at the entrances of the hives) two tennis balls were suspended in plastic nets. Moving, fluffy surfaces of the balls irritated bees and provoked them to stinging. One of the ball were sprayed with 4.2 ml of pure water (control group), and the other one were sprayed with 4.2 ml of Composition 1. Numbers of bees stings left on the balls were counted 48 hours after suspending the balls at the entrances of hives.

Counting was performed in ten subsequent repetitions during unproductive period (i.e. during 'robbery time', when colonies aggressively defend their nests). The results of the experiment are summarized in Table F.1.

TABLE F.1

| Tested Group | Subsequent repetition | No. of stings counted | Average No. of stings |
|---|---|---|---|
| Control | 1. | 24 | 21.6 |
|  | 2. | 11 |  |
|  | 3. | 17 |  |
|  | 4. | 9 |  |
|  | 5. | 18 |  |
|  | 6. | 27 |  |
|  | 7. | 43 |  |
|  | 8. | 26 |  |
|  | 9. | 18 |  |
|  | 10. | 23 |  |
| Composition 1 | 1. | 0 | 0.6 |
|  | 2. | 1 |  |
|  | 3. | 0 |  |
|  | 4. | 0 |  |
|  | 5. | 0 |  |
|  | 6. | 0 |  |
|  | 7. | 2 |  |
|  | 8. | 0 |  |
|  | 9. | 3 |  |
|  | 10. | 0 |  |

The results of the experiment clearly demonstrate lower aggression of worker bees towards balls sprayed with Composition 1. Furthermore while counting the stings stuck into the ball surface it has been noted that some worker bees are still present on the balls sprayed by Composition 1, trying to lick the surface of the material by their tongues. Interest in this material by worker bees, shows that even after 2 days of spraying, the balls were still attractive for them, and in contrast to the control group, did not cause irritation. The same material sprayed by Composition 1, was clearly less stung by the guardian bees. Clearly, the fragrance of Composition 1 is calming and attractive for bees, almost completely eliminating their stinging instinct.

The experiments proved that composition according to the invention substantially influences behavior of bees. Composition 1 substantially increased the efficiency of introducing bee queens to colonies. It has also tranquilized worker bees inhibiting stinging instinct. Composition 1 leads to a specific state and behavior of bees covering expression of their natural instincts.

Due to the exceptional features of the composition according to the invention and dues to the fact that no side effects in the above discussed experiments have been observed, it is therefore appropriate to use thereof in various apiculture applications.

All the above embodiments of the present invention are merely exemplary. These and other factors, however, should not be considered as limiting the spirit of the invention, the intended scope of protection of which is indicated in appended claims.

The invention claimed is:

1. A bee attracting and/or bee tranquilizing composition in the form of an oil/water emulsion having an oil phase in an aqueous phase, characterized in that the oil phase contains citral that is 3,7-dimethylocta-2,6-dienal, eugenol that is 4-allyl-2-methoxyphenol, and an oil carrier in an amount of 10% to 50% by weight based on the total weight of the composition, the weight ratio of citral to eugenol is in a range from 1 to 10, and the aqueous phase contains a soluble carbohydrate sweetener in an amount of 15% to 60% by weight based on the total weight of the aqueous phase; wherein the oil carrier is a vegetable oil.

2. The composition according to claim 1, characterized in that said sweetener is selected from the group consisting of: saccharose, fructose, glucose, sugar, inverted sugar syrup, maltose syrup and mixtures thereof.

3. The composition according to claim 1, characterized in that the citral has two isomers of neral and geranial and the isomer proportion of neral and geranial in the citral is within 0.8 to 1.2.

4. The composition according to claim 1, characterized in that said oil phase further comprises an agent modifying the viscosity of the oil phase, in an amount of 0.2% to 4% by weight based on the total weight of the composition.

5. The composition according to claim 1, characterized in that it further comprises at least one additional agent selected from the group consisting of: antifoam agents, surfactants and dispersion stabilizers.

6. The composition according to claim 1, characterized in that it further comprises an agent enhancing the oxidative stability of the composition.

7. The composition according to claim 1, characterized in that it has pH in the range of 4 to 7.

8. A method for increasing the productivity of a crop area requiring bee pollination, characterized in that it comprises the step of applying the bee attracting composition defined in claim 1 over the crop area at the beginning of and/or during the blooming period.

9. A method for increasing the efficiency of introducing a replacement queen bee to a new bee colony characterized in that it comprises the step of applying the bee tranquilizing composition defined in claim 1 over a replacement queen bee and/or a bee colony and/or a honeycomb gathered with a bee colony to which the replacement queen bee is to be administered.

10. A method for increasing the efficiency of joining bee colonies characterized in that it comprises the step of applying the bee tranquilizing composition defined in claim 1 over at least one bee colony and/or at least one honeycomb gathered with bee colony to be joined.

11. A method for tranquilizing bees characterized in that it comprises the step of applying the bee tranquilizing composition defined in claim 1 over a bee queen, a honeycomb, a bee hive and/or an object and/or area in the vicinity of the bee hive.

12. The composition according to claim 1, wherein the weight ratio of citral to eugenol is in a range from 1.7 to 5.

13. The composition according to claim 1, wherein said oil carrier is rapeseed oil, corn oil, or mixtures thereof.

14. The composition according to claim 4, wherein the agent modifying the viscosity of the oil phase is polymeric surfactant.

* * * * *